US006543264B2

(12) United States Patent
Frolov

(10) Patent No.: US 6,543,264 B2
(45) Date of Patent: Apr. 8, 2003

(54) MORTISE LOCKSET WITH INTERNAL CLUTCH HAVING OVERRIDE FEATURE

(75) Inventor: George Frolov, Farmington, CT (US)

(73) Assignee: Harrow Products, Inc., Woodcliff Lake, NJ (US)

( * ) Notice: Subject to any disclaimer, the term of this patent is extended or adjusted under 35 U.S.C. 154(b) by 0 days.

(21) Appl. No.: 09/918,255

(22) Filed: Jul. 30, 2001

(65) Prior Publication Data

US 2003/0019256 A1 Jan. 30, 2003

(51) Int. Cl.[7] .............................................. B60R 25/02

(52) U.S. Cl. ............................ 70/222; 70/149; 70/218; 70/106

(58) Field of Search .......................... 70/218, 222–224, 70/106, 141, 144, 149

(56) References Cited

U.S. PATENT DOCUMENTS 1,668,553 A * 5/1928 Douglas ...................... 70/223
1,918,411 A * 7/1933 Lowe .......................... 70/223
3,896,645 A * 7/1975 Nagy et al. .................... 70/149
3,922,896 A * 12/1975 Kagoura ...................... 70/223
3,990,277 A * 11/1976 Mullich .................... 70/149 X
3,999,411 A * 12/1976 Kambic ....................... 70/144
4,448,050 A * 5/1984 Nugent et al. ................ 70/223
4,631,944 A * 12/1986 Gater et al. ............... 70/149 X
4,770,012 A * 9/1988 Johansson et al. ............ 70/278
4,854,143 A * 8/1989 Corder et al. ................. 70/218
5,372,025 A * 12/1994 Lin .......................... 70/149 X
5,475,996 A * 12/1995 Chen ........................... 70/279
5,640,863 A * 6/1997 Frolov ...................... 70/149 X
5,768,926 A * 6/1998 Shen ........................... 70/149
5,813,257 A * 9/1998 Claghorn et al. ............. 70/208
5,868,018 A * 2/1999 Kang ....................... 70/149 X
5,992,195 A * 11/1999 Huang ...................... 70/218 X
6,216,500 B1 * 4/2001 Kang .......................... 70/224
6,330,817 B1 * 12/2001 Frolov ......................... 70/280
6,363,762 B1 * 4/2002 Kueng ....................... 70/278.3
6,393,878 B1 * 5/2002 Fayngersh et al. ........ 70/106 X

* cited by examiner

*Primary Examiner*—Suzanne Dino Barrett
(74) *Attorney, Agent, or Firm*—Michael Best & Friedrich LLP

(57) ABSTRACT

A lock mechanism has a housing and a latch extending from the housing. The latch has an extended position and a retracted position. The mechanism includes apparatus for biasing the latch to the extended position, apparatus for defining a locked mode and an unlocked mode, and apparatus including a clutch for transferring an operator input motion to move the latch to the retracted position in the unlocked mode. The clutch includes a cam surface and a cam follower. A spring biases the cam follower toward the cam surface and a second override spring which biases the cam follower to compensate for any off-center relationship due to wear, excessive force and/or assembly misalignment and to prevent jamming.

20 Claims, 9 Drawing Sheets

MORTISE LOCKSET WITH INTERNAL CLUTCH HAVING OVERRIDE FEATURE

BACKGROUND OF THE INVENTION

1. Field of the Invention

This invention relates generally to mechanical locksets employed to secure doors. More particularly, the present invention relates generally to a mortise-type lockset that incorporates an internal clutch assembly.

2. Description of the Related Art

Recent hardware trends and the Americans with Disabilities Act requirements for lever handles at both exterior and interior sides of doors have focused the market on lever operated lock mechanisms. Because both intruders and users can impose greater forces on the lock mechanism having lever operating systems, it is particularly important to provide a mechanism that is not vulnerable to being compromised intentionally or otherwise. In some cases lever operated lock mechanisms have included a mechanical clutch mounted between the operator or operating handle and the lockset. Such clutches selectively mechanically couple the operating handle to the lockset and permit rotation of the operating handle to retract the latch or bolt and allow entry through the doorway.

An example of an electromechanical type of clutch may be found in U.S. Pat. No. 5,640,863. Such separate, add on clutches work well and have the advantage of being compatible with existing locksets, allowing existing key-based security systems to be retrofitted with electronic security capabilities. Purely mechanical clutch assemblies are typically used between a handle or operator and the bolt of a lockset. Typically, if the door is locked either with a thumb turn or a key, the clutch assembly uncouples the mechanical connection between the operator and the bolt. Thus, an intruder who attempts to use brute force to turn the operating handle will realize that no amount of force will withdraw the bolt and allow entry through the doorway secured by the lockset.

In some cases known clutch mechanisms have been vulnerable, particularly after years of service, due to wearing of the individual parts thereof. This may lead to mechanisms that jam and become inoperative. In some cases, however, wear of the components may result in malfunctions such as jamming or make the assembly inoperative and prevent access to the secured side of the door or even prevent egress from the secured side to the unsecured side.

SUMMARY OF THE INVENTION

Briefly stated, the invention in a preferred form is a lockset which includes a housing and a latch extending from the housing. The latch has an extended position and a retracted position. The mechanism includes apparatus for biasing the latch to the extended position, apparatus for defining a locked mode and an unlocked mode, and apparatus for transferring an operator input motion to move the latch to the retracted position in the unlocked mode. The apparatus for transferring includes a locking piece, a cam surface and a cam follower. A spring biases the cam follower in a first direction toward the cam surface and a second spring provides an override movement of the locking piece to thereby compensate for any off-center relationship between the rotation axis of the follower and the cam surface and to prevent jamming of the locking piece.

The first and second springs are coil springs disposed in coaxial relationship. The second coil spring has a higher spring rate than the spring rate of the first coil spring. The first and second coil springs may be disposed in coaxial relationship with a pin of the cam follower. The locking piece receives the pin and has a cup-shaped portion which may be disposed in generally coaxial relationship with the first and second coil springs to form a retainer flange for the second coil spring. The retainer flange is disposed intermediate axial extremities of the first coil spring and the second coil spring.

An object of the invention is to provide a lock mechanism that will minimize the risk of jamming of the mechanism despite repeated use of the mechanism for a very large number of duty cycles.

Another object of the invention is to provide a lock mechanism that will function consistently to self compensate for liberal manufacturing tolerances, assembly misalignment, wear and/or extreme forces applied to the mechanism.

These and other objects, features and advantages of the invention will become readily apparent to those skilled in the art upon reading the specification in conjunction with the accompanying drawings.

DETAILED DESCRIPTION OF THE PREFERRED EMBODIMENT

Figure 1:
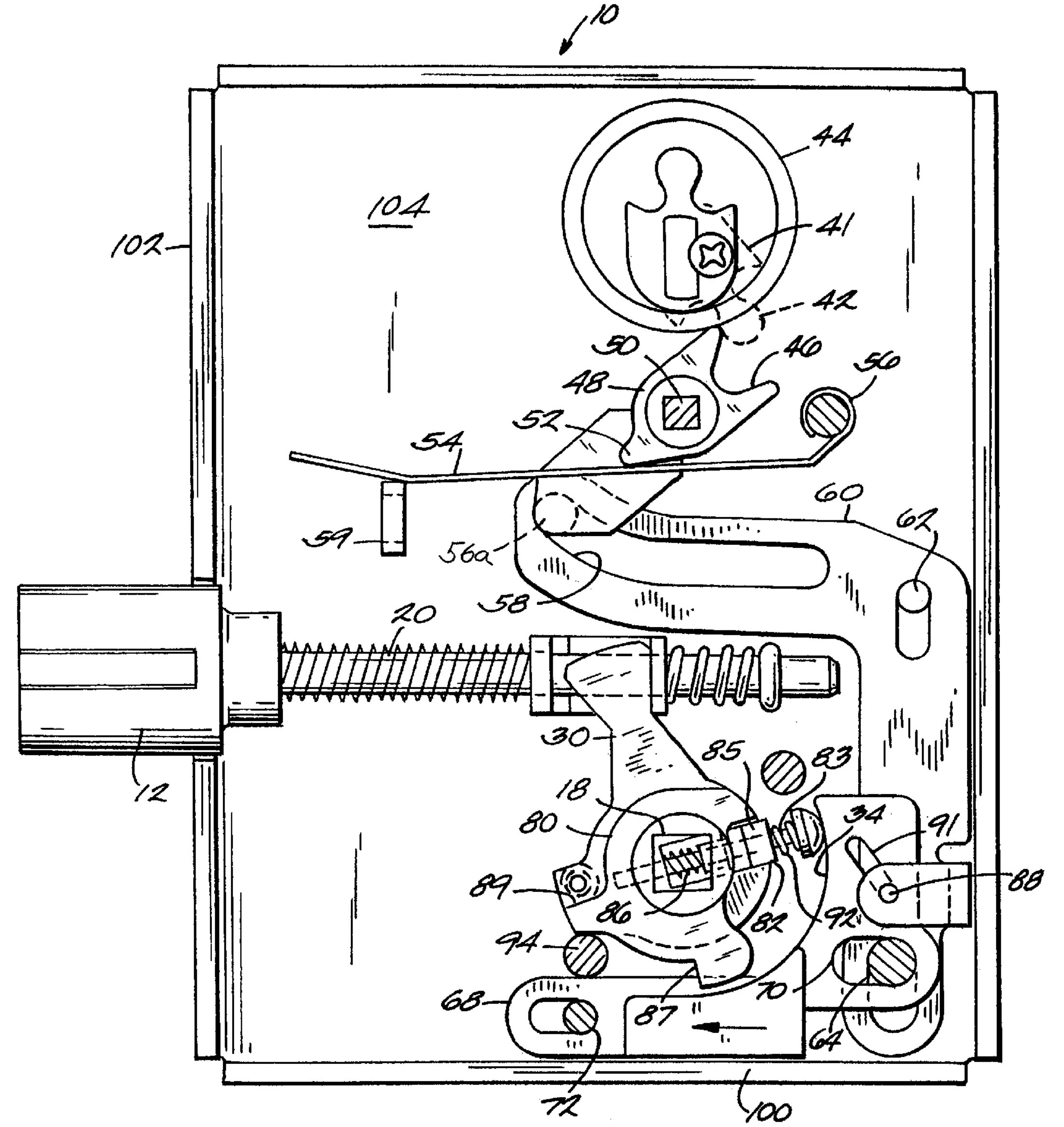
FIG. 1 is a broken away side view, as viewed from the outside (unsecured side) of a secured enclosure, illustrating the configuration of the respective components in a lock mechanism in accordance with one form of the present invention after the mechanism has been unlocked either by a key from the outside (unsecured) or a thumb turn from the inside of the enclosure secured by the lock mechanism and before the operating handle is moved from its normally horizontal null position.

With reference to the drawings wherein like numerals represent like parts throughout the several figures, one embodiment of the mortise lockset, in accordance with the present invention is generally designated by the numeral 10. The mortise lockset 10 is mountable in the mortise of a door (not illustrated) and is adapted to engage the strike of a doorframe (not illustrated). The mortise lockset 10 is equipped with both key and thumb turn locking assemblies disposed, respectively, on the outside (unsecured side) and the inside of the enclosure, such as a room, being secured by the lock mechanism. It will be understood that for the illustrated environment, the lockset is always unlocked from the secured side because it is located at the interior of the secured enclosure and is used only for egress from the enclosure.

The mortise lockset 10 comprises a substantially rectangular lock case 100 that includes an integral backing plate 104. The case 100 provides a mounting surface for the components as well as a protective housing and a support for mounting the mortise lockset 10 in the mortise of a door. When the mortise lockset 10 is installed in the mortise of a door, the face plate 102 is flush with the latch edge of the door and disposed in opposing parallel relationship to the strike of the door frame when the door is closed.

FIGS. 1–4 illustrates the mortise lockset 10 with the front plate 106 of the lock case 100 removed, so the internal components are easily viewed. Conversely, FIG. 5 illustrates the opposite side of the mechanism with the integral backing plate 104 removed and shows the front plate 106. When assembled, the mortise lockset may be installed in a rectangular mortise typical of any conventional mortise lockset.

The mechanism includes a latch or bolt 12 that is preferably a generally rectangular member having a short beveled free end. In some forms of the invention, the bolt 12 may have a curved surface at the projected or outer end. The outer end may further include a recessed roller (not shown). Conventionally, the latch of a self-latching lockset typically has a beveled outer end. As a door closes, the beveled surface of the latch engages the strike of the door frame and is forced back into the lockset until the door reaches a position in which the latch can project into the latch opening in the strike. This has been the typical operation of a self-latching lockset and has dictated the need for a large beveled surface on the outer end of the latch.

A mortise lockset, in accordance with another form of the present invention, achieves self-latching convenience without need for a large beveled surface on the latch or the typically short latch throw of prior art self-latching locksets.

The access control features of the mortise lockset 10 are best initially explained with reference to FIGS. 1–5. A pivotally mounted retraction lever 30 is mechanically coupled to a reciprocally mounted throw rod 20 so that pivotal movement of the retraction lever 30 will overcome the bias of a spring 28 that urges the bolt 12 to the extended position. Accordingly, this movement in the direction of the FIG. 2 arrows causes the bolt 12 to retract. The retraction lever 30 is pivotable by an operating lever (not shown) disposed on the outside (unsecured) of the door and selectively rotatably coupled to an outside cam 80 under certain circumstances. (The term "outside" of course refers to the unsecured side for purposes of describing the preferred embodiment.) Similarly, the retraction lever 30 is pivotable by an operating lever (not shown) and disposed on the inside (secured) of the door and rotatably coupled to an inside cam 40 at all times. Because it is desired that egress from the secured room be available at all times, the inside cam 40 rotatably retracts the retraction lever 30.

The coupling of the outside cam 80 to the retraction lever 30 is governed by a T-shaped locking piece 82 that receives and is carried on a reciprocally mounted engagement or locking pin 83. The engagement or locking pin 83 is carried on the retraction lever 30. A convex head 84 of the engagement or locking pin 83 engages a displaceable camming surface 34 and functions as a cam follower. The contour and physical position of the camming surface 34 determines the axial position of the engagement or locking pin 83. The axial position of the engagement or locking pin 83 determines the relative position of the locking piece 82 with respect to the outside cam 80 and more specifically with respect to a shoulder 85 on the outside cam 80.

Figure 2:
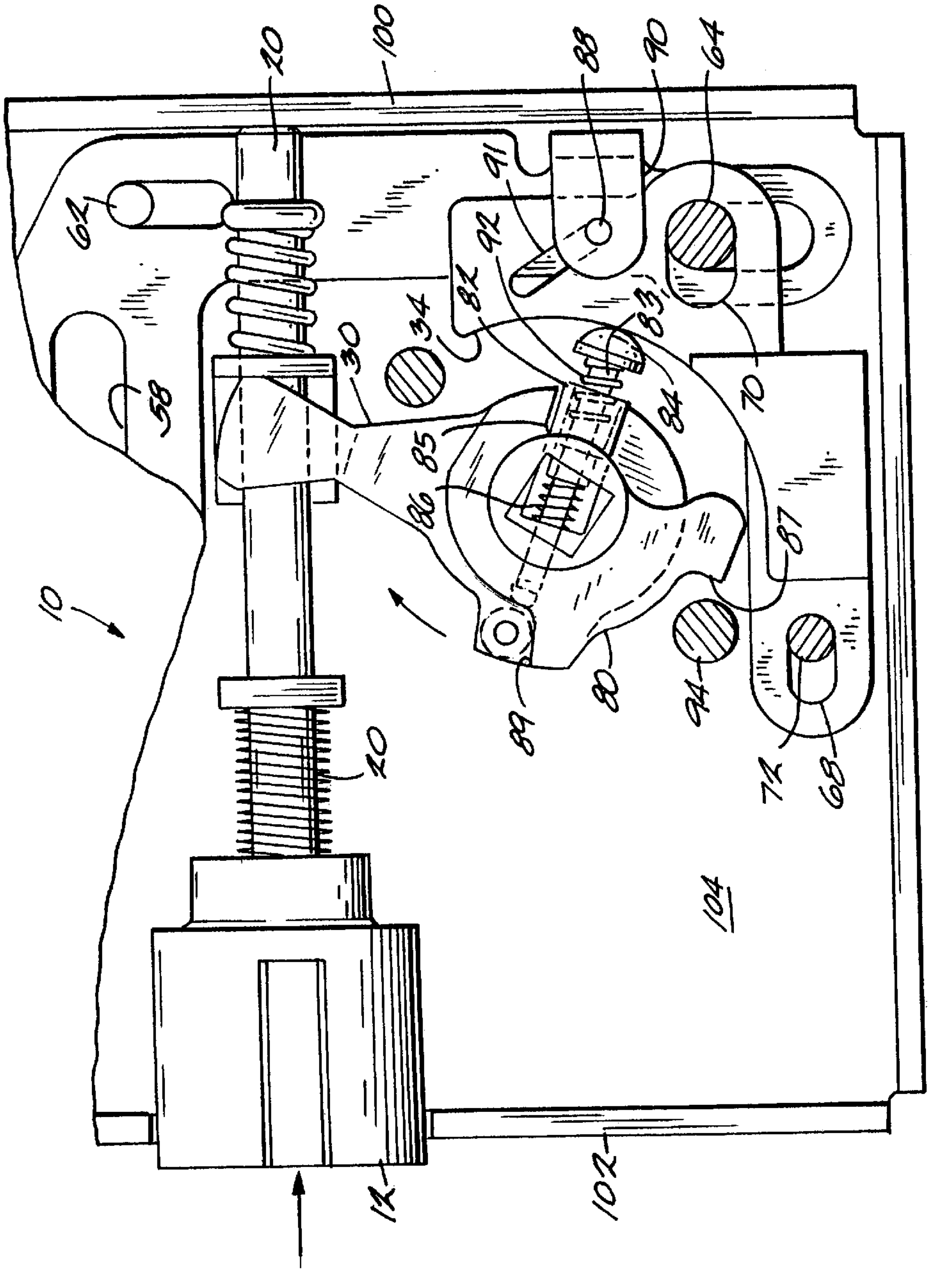
FIG. 2 is a fragmentary broken away side view, as viewed from the outside (unsecured side) of a secured enclosure, illustrating the configuration of the respective components in the lock shown in FIG. 1, after the mechanism has been unlocked either by a key from the outside (unsecured side) or a thumb turn from the inside of the enclosure secured by lock mechanism and after the operating handle has been moved from its normally horizontal position to retract the bolt.

The mechanism will best be understood by reference first to FIGS. 1–4, consideration of the respective modes of operation in these Figures and comparison of the positions of the respective elements. FIG. 1 is a side view, as viewed from the outside (unsecured side) of a room, illustrating the configuration of the respective components after the mechanism has been unlocked either by a key from the outside or a thumb turn (not shown) from the inside of the room secured by the lock mechanism and before the operating handle is moved from its normally horizontal position. More particularly, an arm 41 having a circular extremity or nose 42 is pivotally mounted as best seen at the top of FIGS. 1 and 2. Thus, the position shown in a dashed line in FIG. 1 is the position corresponding to the unlocked mode as determined by the key (not shown) in cooperation with a lock cylinder 44 or thumb turn (not shown). In this mode the latch operator may be a lever, doorknob or other conventional operator (none illustrated) that connects via a spindle 18 for operating the latch or bolt 12.

Figure 3:
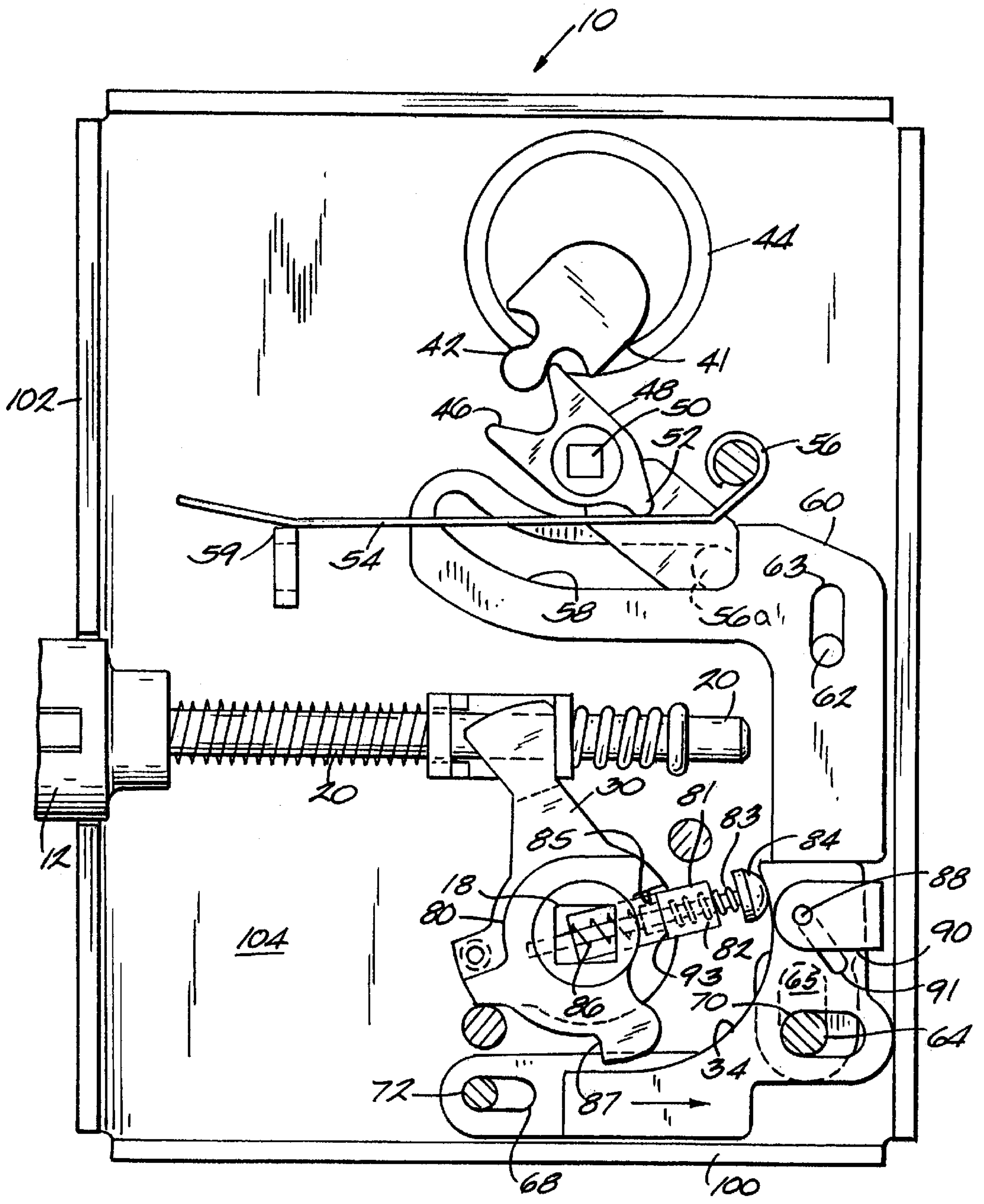
FIG. 3 is a broken away side view, as viewed from the outside (unsecured) of a secured enclosure, illustrating the configuration of the respective components in the lock mechanism shown in FIG. 1 after the mechanism has been locked either by a key from the outside (unsecured) of the enclosure or a thumb turn within the enclosure and before any rotation of the operating handle.

In the operating mode illustrated in FIG. 3, the arm 41 with the circular extremity 42 has been rotated clockwise (as viewed) in response to locking by a key and lock cylinder 44 or the thumb turn (not shown). A detailed comparison of FIGS. 1 and 3 provides an understanding of respectively the unlocked and locked modes and the impact on the mechanical linkage extending from the arm 41 to the convex head 84. It is this linkage in combination with the locking piece 82, the engagement or locking pin 83, and the shoulder 85 of the outside cam 80 that constitutes the locking/unlocking mechanism controller responding to movement of an operating lever disposed on the outside of the room secured by the mortise lockset 10. More specifically, this mechanism will (a) couple an operating lever in a manner that results in withdrawal of the bolt 12, when the operating lever (not shown) is rotated from a null horizontal position when the arm 41 is in the unlocked position and (b) uncouple an operating lever in a manner that results in no motion of the bolt 12 when the operating lever is rotated from a null position with the arm 41 in the locked position.

The circular extremity or nose 42 of the arm 41 cooperates with a recess 46 of a bistable arm 48 that is pivotally mounted for movement around an axis 50. The bistable arm 48 has a nose 52 that abuts a leaf spring 54. The leaf spring 54 extends around a post 56 and is supported by a support 59. Thus, a key and cylinder 44 or the thumb turn (not shown) causes rotation of the arm 41 which in turn causes the bistable arm 48 to move from the position shown in FIG. 1 to the position shown in FIG. 3. As will be apparent by inspection of the drawings, when the bistable arm 48 is disposed in a generally vertical position (the midway point between the positions shown in FIGS. 1 and 3), the spring 54 imposes a maximum force that is substantially vertical. Thus, the force imposed by the spring 54 on the rounded nose 52 produces two stable positions of the bistable arm 48. Accordingly, as a person rotates either the thumb turn (not shown) or the key and cylinder 44, the bistable arm 48 will by virtue of the force imposed by the leaf spring 54 naturally assume either the position illustrated in FIG. 1, corresponding to an unlocked mode, or the position in FIG. 3, corresponding to a locked mode.

The lower (as viewed) extremity of the bistable arm 48 has a laterally extending cylindrical surface, such as post 56*a*, that is dimensioned and configured for engaging a curved slot 58 in an L-shaped arm 60. The L-shaped arm 60 is carried by pins 62, 64 that engage respective elongated parallel slots 63, 65 in the L-shaped arm 60. Accordingly, pivotal motion of the bistable arm 48, about the axis 50 in a counter clockwise direction (as viewed in FIGS. 1 and 3), causes the post 56*a* to move between the positions illustrated respectively in FIGS. 1 and 3. In other words, the post 56*a* moves from the left axial extremity to the right axial extremity of the slot 58. As a result, the vertical leg of the L-shaped arm 60 will move upward to the position illustrated in FIG. 3 from the position illustrated in FIG. 1.

The camming surface 34 is provided with two elongated parallel slots 68, 70 that engage respectively a pin 72 carried by the plate 104 and a pin 64 also carried by the plate 104. The pin 64, as described above, also supports the L-shaped arm 60. An elongated oblique slot 91 in the camming surface 34 cooperates with a pin 88, a clevis 90 and an L-shaped arm 60 to translate the vertical motion of the L-shaped arm 60 into a horizontal (as viewed) movement of the camming surface 34.

Accordingly, movement of the nose 42 by pivotal clockwise motion of the arm 41 to the position illustrated in FIG. 3 allows the convex head 84 to move to the right (as viewed) to prevent engagement of the locking piece 82 with the shoulder 85 of the outside cam 80. Thus, movement of the operating lever does not cause the bolt 12 to retract. Conversely, movement of the nose 42 by pivotal counterclockwise motion of the arm 41 to the position illustrated in FIG. 1, forces the convex head 84 to move to the left (as viewed) to cause engagement of the locking piece 82 with the shoulder 85 of the outside cam 80. Thus, applying a torque to obtain movement of the operating lever causes the bolt 12 to retract.

Figure 4:
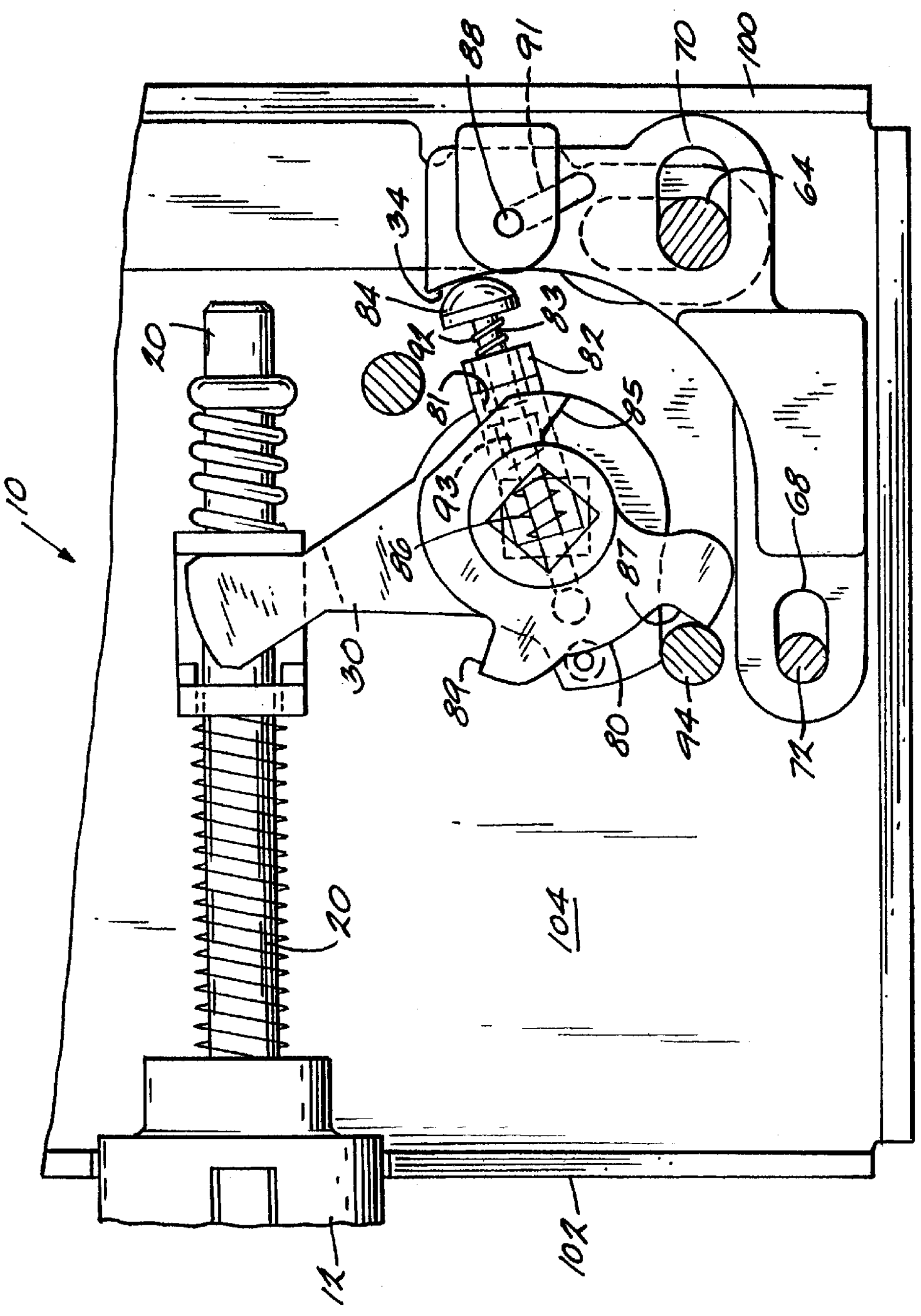
FIG. 4 is a fragmentary broken away side view, as viewed from the outside (unsecured) of the enclosure, illustrating the configuration of the respective components in a lock mechanism shown in FIG. 1 after the mechanism has been locked either by a key from the outside (unsecured) of the enclosure or by a thumb turn within the enclosure and after rotation of the operating handle in an attempt to withdraw the bolt.
Figure 5:
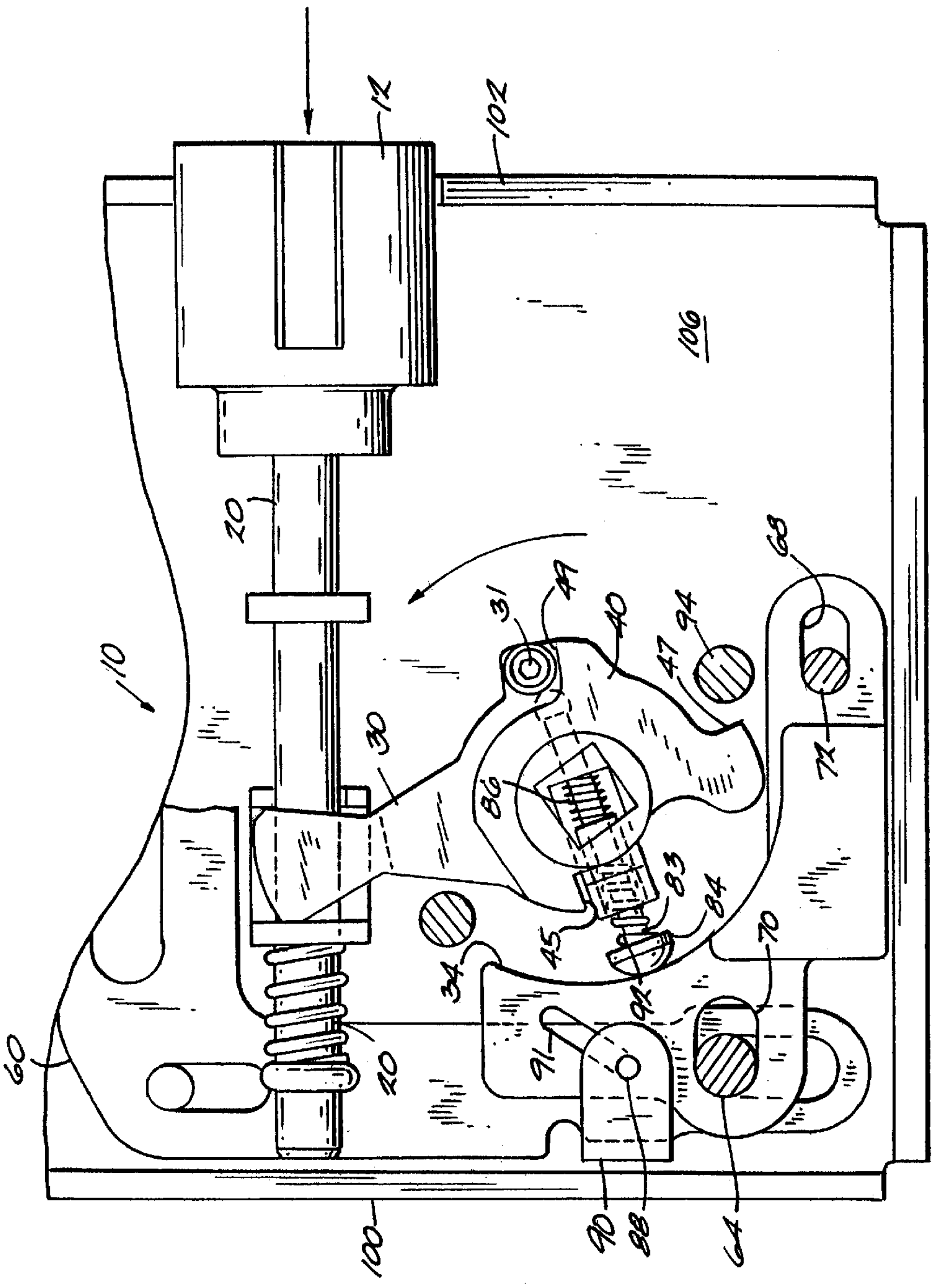
FIG. 5 is a fragmentary broken away side view, as viewed from the interior of the enclosure, illustrating the configuration of the respective components in the lock mechanism illustrated in FIG. 1 and more specifically, illustrating the mechanism after the operating handle has been rotated to cause withdrawal of the bolt.
Figure 6:
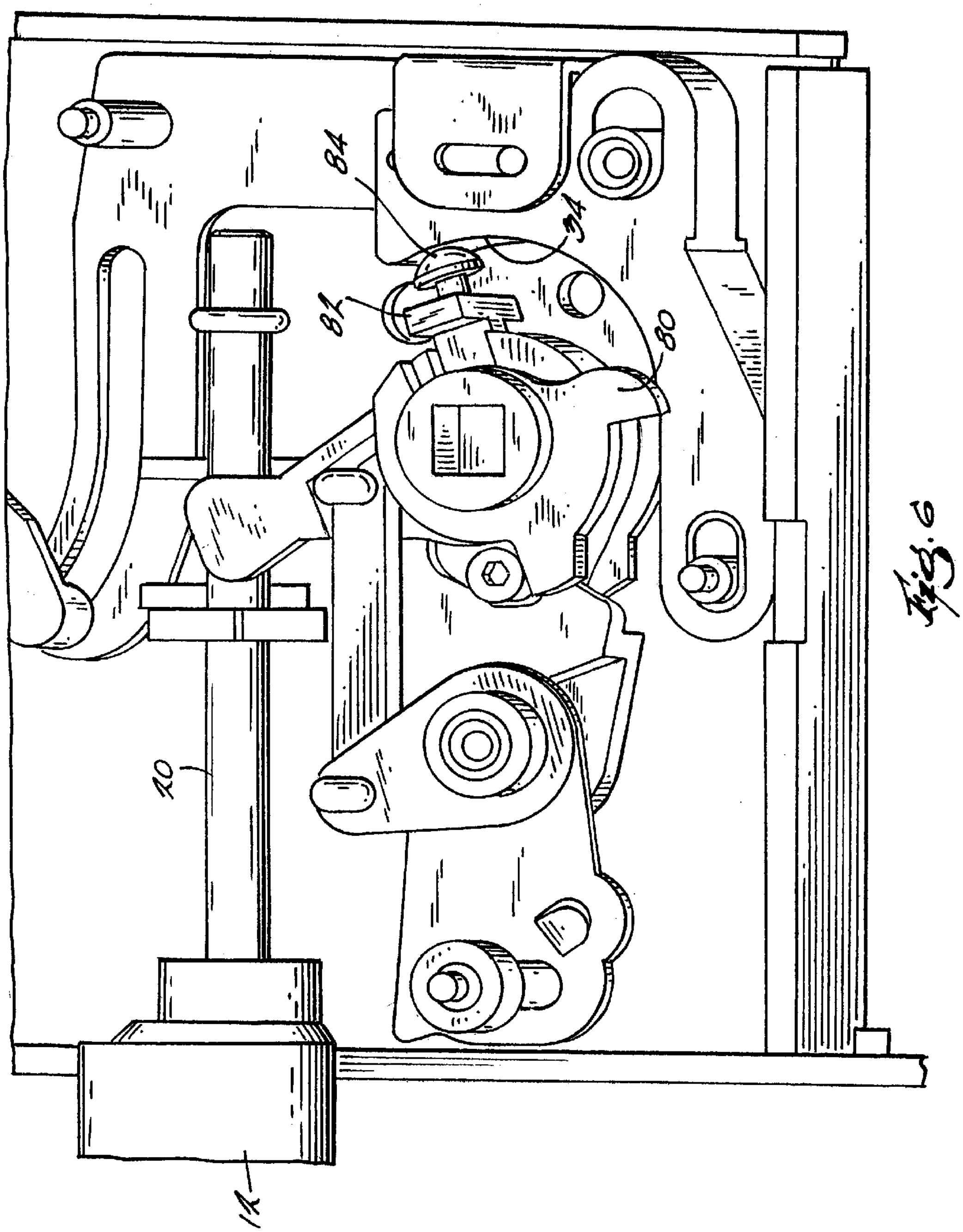
FIG. 6 is an interior perspective view, portions being removed and portions being shown in a quasi-schematic form, of the lock mechanism of FIG. 1, illustrating the lock mechanism in a locked configuration.
Figure 7:
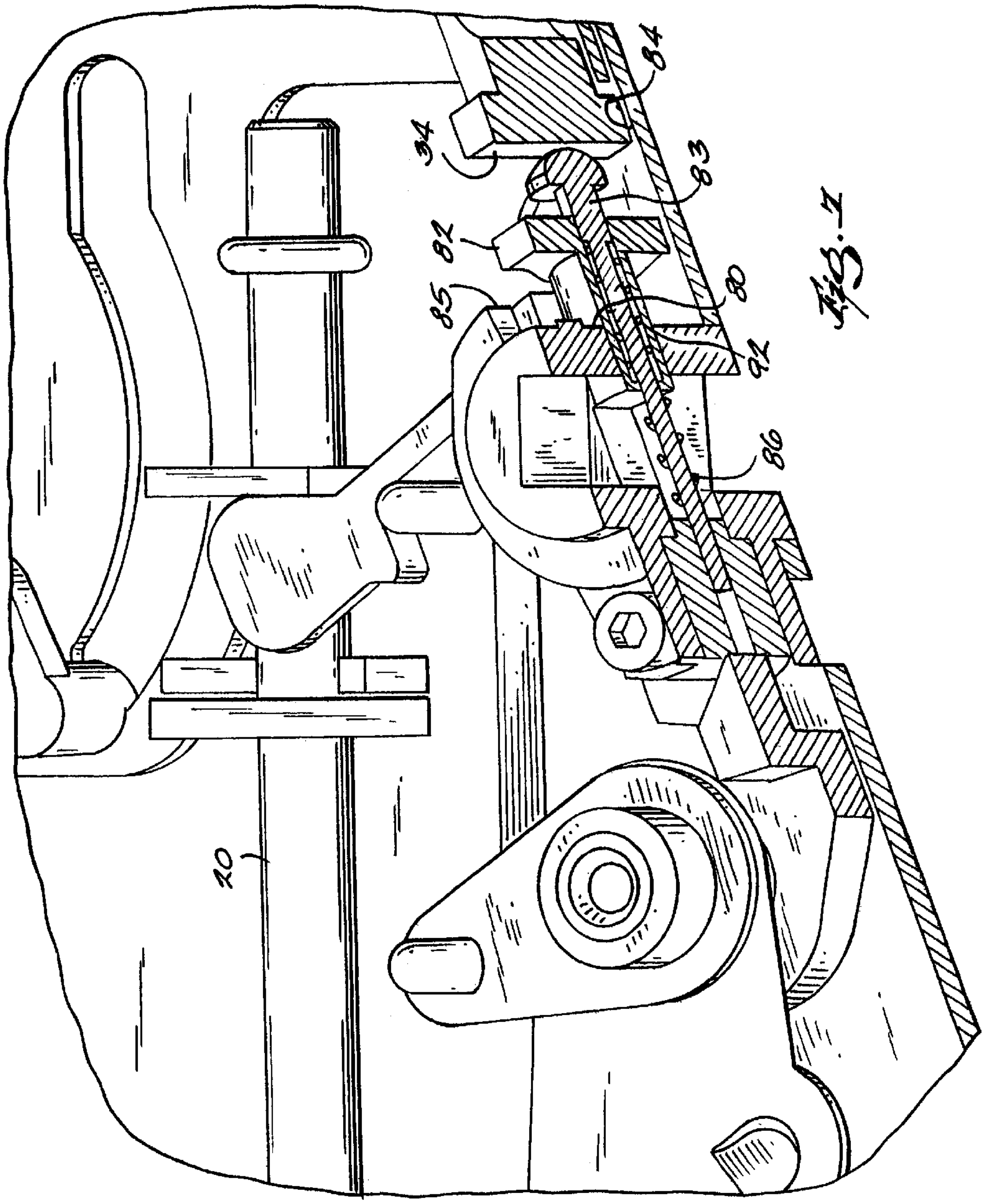
FIG. 7 is an interior perspective view, taken along a central section through the clutch portion of the lock mechanism of FIG. 6, portions being removed, and portions partially being illustrated in quasi-schematic form.

Angular movement of the outside cam 80 is limited by a stop 87 on the outside cam 80 that engages a post 94 carried by the plate 104 as best seen in FIG. 4. Typically, the operating lever is rotated through an angle of approximately 60 degrees before the stop 87 engages the post 94.

The operation can best be sequentially understood by reference to the sequence of FIGS. 1–4. FIG. 1 illustrates a lock mechanism, as viewed from the outside of the room secured by the lock. The lock mechanism has been unlocked either by a key from the outside or a thumb turn from the inside of the room before the operating handle is moved from its normally horizontal null position. FIG. 2 is also viewed from the outside of a room, illustrating the configuration of the respective components in the lock after the mechanism has been unlocked either by a key from the outside or a thumb turn from the inside (secured) of the room and after the operating handle has been moved from its normally horizontal position to retract the bolt. FIG. 3 is a broken away side view, as viewed from the outside of a room, illustrating the configuration of the respective components after the mechanism has been locked either by a key from the outside of the room or a thumb turn within the room and before any rotation of the operating handle. FIG. 4 is a broken away side view, as viewed from the outside of the room, illustrating the configuration of the respective components in a lock mechanism shown in FIG. 1 after the mechanism has been locked either by a key from the outside of the room or by a thumb turn within the room and after rotation of the operating handle in an attempt to withdraw the bolt.

The inside cam 40 and the outside cam 80 are mirror images of each other. Each cam 40, 80 is provided with a shoulder 45, 85 for engagement with the locking piece 82, a lobe which defines a stop 47, 87 and a third shoulder 49, 89. The coupling arrangement is configured so that the shoulder 49 of the inside cam 40 is engageable against a pin 31 fixed to the retraction lever 30. As illustrated in FIG. 5, rotation in the direction of the arrow transmits a rotational force applied to the inside cam 40 by the operating handle (not illustrated) to pivot the retraction lever 30, retract the bolt 12 and open the door, thus allowing free egress from the area secured by the door and free entry into the area secured by the door.

The locking piece 82 is positionable for selective engagement by the outside cam 80 as determined by the lock/unlocked status of the lock mechanism. Accordingly, in a locked mode, the engagement or locking pin 83 and the locking piece 82 are biased and permitted to move away from the common axis of rotation shared by the inside cam 40, the outside cam 80 and the retraction lever 30. Such movement disengages the locking piece 82 from the shoulder 85 of the outside cam 80. When the mechanical coupling is in the locked mode, the outside cam 80 rotates independently of the retraction lever 30. Accordingly, rotational movement applied to the outside cam 80 by an operator on the unsecured side of the door will not retract the bolt and open the door.

The T-shaped locking piece 82 and cams 80 and 40 are configured to facilitate reversal of the secured and unsecured sides of the door. The pin 31 may be fixed in either side of the operator lever 30 to extend outwardly therefrom. Accordingly, the pin 31 could be mounted to the opposite side and be engaged by the outside cam shoulder 96 to reconfigure the clutch mechanism for continuous rotational engagement between the operating handle and the outside cam 80 while permitting selective engagement between the inside cam 40 and the locking piece 82. The inside cam 80 is thus configured to control access and the outside cam permits unregulated access. In this manner, the mortise lockset may be easily configured to suit the particular application.

With additional reference to FIGS. 6–9, the locking piece 82 and the locking pin 83 are biased toward a locked position by a pair of springs 86 and 92 which cooperate to provide a reliable locking/unlocking function and also cooperate to prevent jamming or other potential malfunctioning of the locking mechanism. Under some conditions, wear, tolerance buildup, or imprecise assembly that would involve the convex head 84, the camming surface 34, the locking piece 82, the mounting for the locking piece 82 and other components could (without the present dual spring assembly) result in malfunctions such as jamming.

When torque is applied to the operating handle, the force is transferred to the cam surface shoulder 110 and to the locking piece 82 which is also subject to a torque in the opposing direction exerted through the latch assembly and the retraction lever 20. This causes the locking piece 82 to otherwise jam and not be displaced under the bias of spring 86. In addition, because the cam surface 34 is displaced between the locked and unlocked positions, the two cam arcs are not precisely concentric. The jamming could make the assembly inoperative and prevent access to the secured side of the door or even prevent egress from the secured side to the unsecured side.

Figure 8:
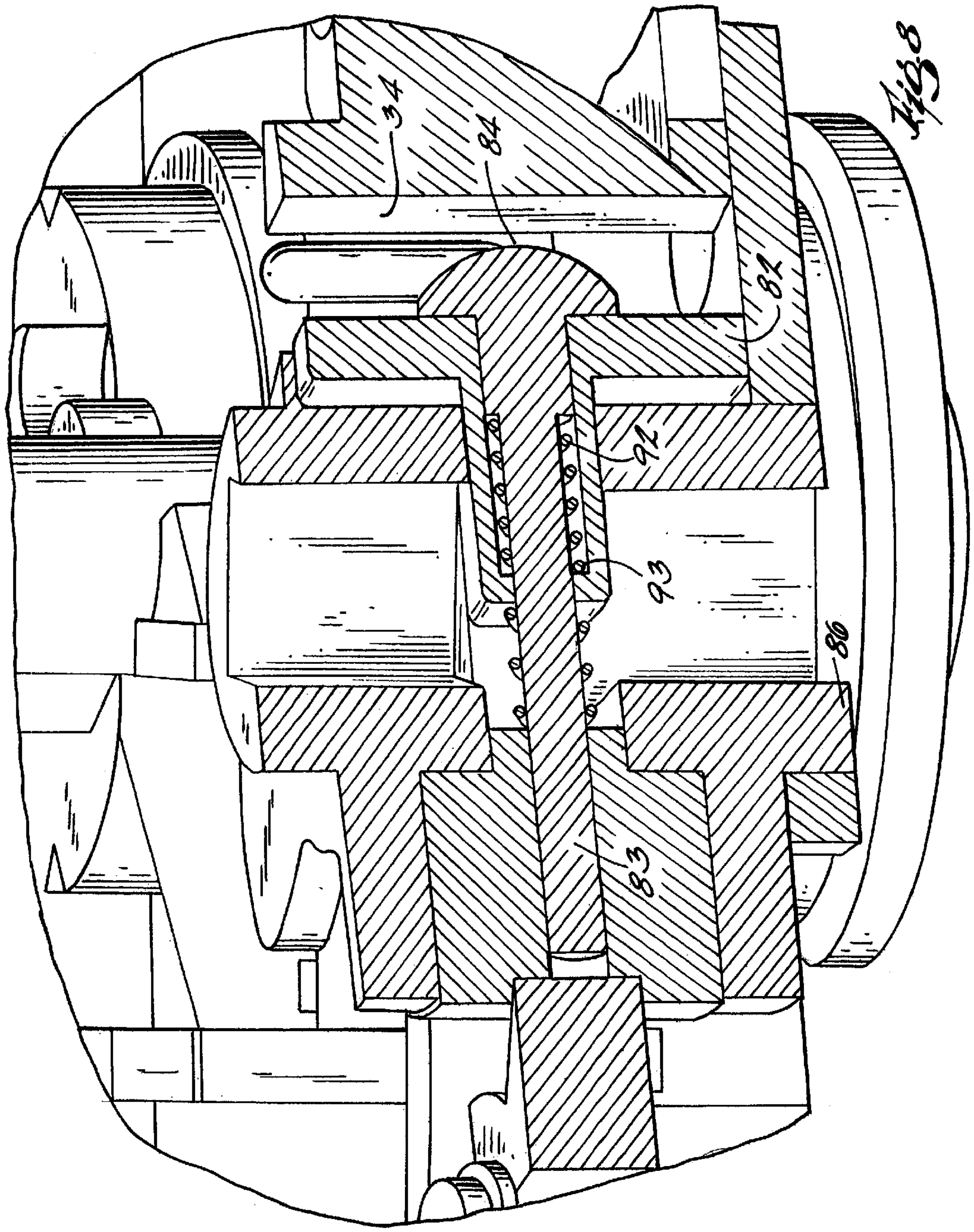
FIG. 8 is an enlarged interior sectional view, portions being removed and portions shown in quasi-schematic form, illustrating the lock mechanism in a hypothetical jammed state for purposes of illustrating an advantage of the invention.
Figure 9:
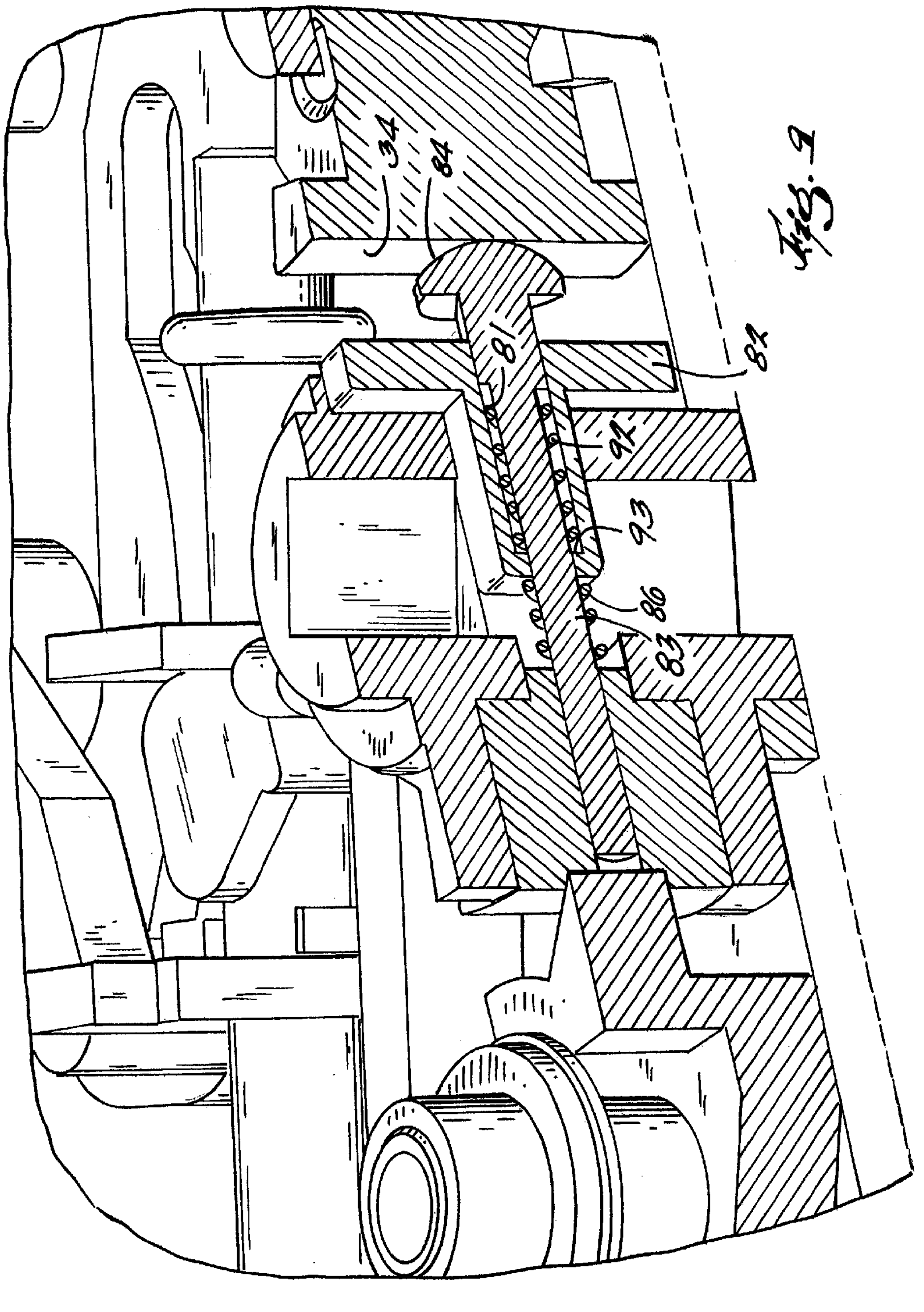
FIG. 9 is an interior perspective view, portions being removed and taken along a central section of the clutch mechanism similar to that of FIG. 8 and further illustrating the lock mechanism in an unlocked mode further illustrating an anti-jam feature of the invention.

As best seen in FIGS. 3, 8, and 9, the locking piece 82 has an axial bore 81 which receives the follower pin 83. A stiff override spring 92 is received in the bore and is retained by a cup-like flange 93 at the end of the bore. The override spring 92 is coaxial with the spring 86 as well as the central stem of the locking piece 82. The spring 92 exerts a spring bias between the flanges and the underside to the follower head 84 (FIG. 3) or a shoulder on the pin (FIG. 8) to bias the head 84 toward the cam surface.

Ordinarily, the spring rate of the override spring 92 will be greater than the spring rate of the spring 86. In one embodiment the ratio of the spring force rates of spring 92 to spring 86 is approximately 10:1. The override spring 92 exerts a consequential biasing force only if jamming has occurred which prevents the effective bias of the spring 86 forcing the follower to properly engage the cam surface 34. In addition, the override spring 92 applies an axial force against the retainer 93 that supports the override spring 92 and biases against the underside of the convex head 84. Because of the force relationship of springs 86 and 92, the locking piece 82 and pin 83 ordinarily move as a unitary assembly under the bias of spring 86. Thus, the spring 86 continues to bias the convex head 84 against the camming surface 34. The principal function of spring 92 is to compensate for any off-center or eccentric operation which may occur in relation to camming surface 34 and the axis of rotation of head 84 which is essentially a cam follower as well as to prevent jamming of the locking piece 82.

The override spring 92 functions to exert an override force in the event of jamming of the clutch mechanism. For example, the reciprocally mounted engagement or locking piece 82 can jam in the retracted position (hypothetically illustrated in FIG. 8) with the spring 86 disposed in a compressed state due to opposing torque forces exerted against the locking piece 82 via the outside cam surface and the latch assembly retraction lever. Thus, even if the camming surface 34 has moved to the right as viewed in FIG. 8, the locking piece 82 and engagement or locking pin 83 may jam in the position shown in FIG. 8 (also FIG. 1), meaning that the door that should be locked will in reality have the operating lever physically coupled to the bolt 12. For such a jam configuration, operation of the operating lever would (without the spring 92) withdraw the bolt 12 contrary to normal expectations.

The override spring 92 thus functions to force the follower head 84 in engagement with the cam surface 34, as illustrated in FIG. 9, to thereby relieve a jam condition which may be caused by an off-center relationship due to wear, misalignment or excessive applied forces.

The invention has been described with respect to a mechanical embodiment. Those skilled in the art will recognize that the same type of override structure may be utilized in electromechanical embodiments. Thus, it must be understood that the mortise lockset in accordance with the present invention incorporates features making it compatible with both keyed and electronic access control systems.

While preferred embodiments of the foregoing invention have been set forth for purposes of illustration, the foregoing description should not be deemed a limitation of the invention herein. Accordingly, various modifications, adaptations, equivalents and alternatives may occur to one skilled in the art without departing from the spirit and the scope of the invention.

What is claimed is:

1. A lock mechanism which comprises:
- a housing;
- a latch extending from said housing, said latch having an extended position and a retracted position;
- means for biasing said latch to the extended position;
- means for defining a locked mode and an unlocked mode; and
- means for transferring an operator input motion to move said latch to said retracted position in said unlocked mode, said means for transferring an operator input motion uncoupling said operator input motion from said latch in said locked mode, said means for transferring including a cam surface and a cam follower, said cam follower having first means biasing said cam follower toward said cam surface and second means biasing said cam follower toward said cam surface, said second biasing means exerting a biasing force which is independent and greater than the biasing force of said first biasing means.

2. The lock mechanism in accordance with claim 1, wherein said first means biasing said cam follower comprises a first coil spring.

3. The lock mechanism in accordance with claim 2, wherein said second means biasing said cam follower comprises a second coil spring.

4. The lock mechanism in accordance with claim 3, wherein said first and second coil springs are disposed in coaxial relationship.

5. The lock mechanism in accordance with claim 4, wherein said second coil spring has a higher spring rate than the spring rate of said first coil spring.

6. The lock mechanism in accordance with claim 5, wherein said cam follower further comprises a pin and wherein said first and second coil springs are disposed in coaxial relationship with said pin.

7. The lock mechanism in accordance with claim 4, further including a cup shaped retainer which receives at least a portion of said second coil spring and is generally coaxial with said first and second coil springs and disposed intermediate axial extremities of said first coil spring and said second coil spring.

8. The lock mechanism in accordance with claim 5, wherein the spring rate ratio of the second spring to the spring rate ratio of the first spring is approximately 10 to 1.

9. The lock mechanism in accordance with claim 6 further comprising a locking member having a cup shaped portion, said second coil spring exerting a bias force against said member and said pin being at least partially received in said member.

10. A lock mechanism which comprises:

a housing;

a latch extending from said housing, said latch having an extended position and a retracted position;

a lock assembly for selectively defining a locked mode and an unlocked mode;

an operator assembly comprising a displaceable cam surface which transfers operator input motion to move said latch to said retracted position in said unlocked mode wherein said cam surface is in a first position and uncouples said operator input motion from said latch in said locked mode wherein said cam surface is in a second position, said operator assembly including a cam follower which controls a lock member and a first spring biasing said cam follower toward said cam surface and a second spring biasing said cam follower toward said cam surface.

11. The lock mechanism in accordance with claim 10, wherein said first and second springs are coil springs disposed in coaxial relationship.

12. The lock mechanism in accordance with claim 11, wherein said second coil spring has a higher spring rate than the spring rate of said first coil spring.

13. The lock mechanism in accordance with claim 10, wherein said cam follower further comprises a pin and said lock member is carried by said pin, and wherein said first and second coil springs are disposed in coaxial relationship with said pin.

14. The lock mechanism in accordance with claim 10 wherein said lock member has a generally T-shaped section and defines a central bore which receives said second spring.

15. The lock mechanism in accordance with claim 14, wherein said follower comprises a pin, said pin partially received in said bore.

16. The lock mechanism in accordance with claim 15, wherein said first spring biases against said pin.

17. A lock mechanism comprising:

a displaceable cam surface;

a lock assembly for selectively positioning said cam surface to define a locked mode and an unlocked mode;

an operator assembly which is rotatable about an axis to selectively retract a latch in accordance with a radial position of a radially displaceable lock member; and a clutch assembly comprising a follower which engages said cam surface and controls the radial position of said lock member, said clutch assembly comprising a first spring and an independent spring biasing said follower against said cam surface.

18. The lock mechanism in accordance with claim 17, wherein said lock member has a cylindrical portion defining an internal flange and follower comprises a pin which is receivable in said cylindrical portion and said second spring exerts a bias force between said flange and said pin.

19. The lock mechanism in accordance with claim 18, wherein said first spring exerts a bias force against said pin.

20. The lock mechanism in accordance with claim 19, wherein said second spring exerts a spring force greater than said first spring force.

* * * * *